United States Patent
Chen et al.

(10) Patent No.: US 7,167,250 B2
(45) Date of Patent: *Jan. 23, 2007

(54) SYSTEM AND METHOD FOR REDUCING FIBER OPTIC GYROSCOPE COLOR NOISE

(75) Inventors: Chung-Jen Chen, Phoenix, AZ (US); Charles H. Lange, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/784,811

(22) Filed: Feb. 24, 2004

(65) Prior Publication Data

US 2004/0165190 A1 Aug. 26, 2004

Related U.S. Application Data

(63) Continuation-in-part of application No. 10/135,245, filed on Apr. 30, 2002, now Pat. No. 6,744,519.

(51) Int. Cl.
*G01C 19/72* (2006.01)

(52) U.S. Cl. .................................... 356/464

(58) Field of Classification Search ............... 356/460, 356/464; 250/227.19, 227.27; 385/12
See application file for complete search history.

(56) References Cited

U.S. PATENT DOCUMENTS

| | | | |
|---|---|---|---|
| 5,914,781 A | 6/1999 | Jaklitsch et al. | |
| 5,999,304 A | 12/1999 | Sanders et al. | |
| 6,473,182 B1 * | 10/2002 | Tazartes et al. | ............. 356/464 |
| 6,744,519 B2 * | 6/2004 | Lange et al. | ................ 356/464 |
| 6,765,678 B2 * | 7/2004 | Strandjord et al. | ......... 356/460 |
| 2003/0202187 A1 | 10/2003 | Lange et al. | |

OTHER PUBLICATIONS

International Search Report: PCT/US2004/037125, International Search Authority—European Patent Office, Apr. 1, 2005, 6 pages.

* cited by examiner

*Primary Examiner*—Gregory J. Toatley, Jr.
*Assistant Examiner*—Michael A. Lyons
(74) *Attorney, Agent, or Firm*—Ingrassia Fisher & Lorenz

(57) ABSTRACT

A phase jump amplitude and timing controller is used in a fiber optic gyroscope for suppressing color noise. The phase jump amplitude and timing controller inserts a phase/voltage jump into the feedback signal of the loop closure electronics of the fiber optic gyroscope. This phase/voltage jump breaks the repeated pattern of the drive signal. The IOC time-dependent characteristics are totally eliminated by the randomized feedback signal because no repeated signal is applied to the IOC. The randomized amplitude is preferably within the full $\pm\pi$ phase such that the optical errors average to zero. A fixed frequency higher than the interested spectral region can shift the color noise to higher frequency. A randomized frequency can spread the color noise over full spectrum, and totally eliminate the RDS. In other words, the color noise caused by the nonlinearity of the driving circuit and IOC spreads out over a wide range of spectrum such that no distinct frequency peaks are apparent in the spectral domain.

17 Claims, 4 Drawing Sheets

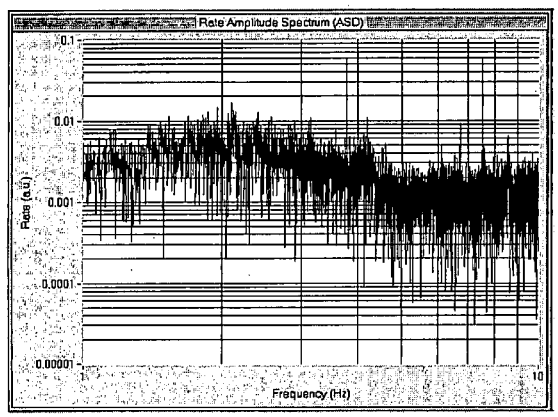 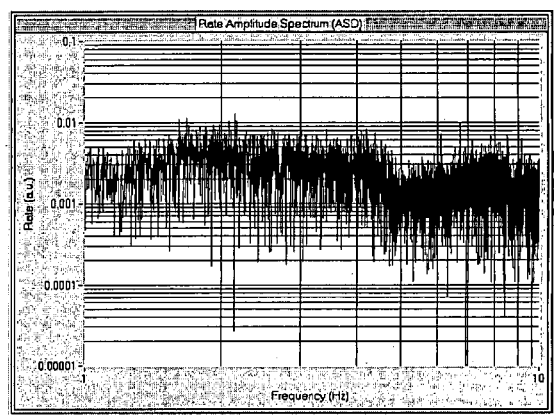
Fig. 5                    Fig. 6

SYSTEM AND METHOD FOR REDUCING FIBER OPTIC GYROSCOPE COLOR NOISE

This application is a continuation-in-part of U.S. patent application Ser. No. 10/135,245, filed Apr. 30, 2002, now U.S. Pat. No. 6,744,519, which is herein incorporated by reference in its entirety.

BACKGROUND

1. Field of the Invention

The present invention relates generally to the control of fiber optic gyroscopes, and more particularly to a method and apparatus to suppress color noise in fiber optic gyroscopes.

2. Background of the Invention

Inertial rotation sensors, for determining orientation and/or rate-of-turn with respect to an inertial frame of reference, are important elements of attitude and heading reference systems used by navigable vehicles such as aircraft. For a long period of time, such orientation and rate-of-turn determinations have typically been made using spinning mass gyroscopes. Progress in the field has resulted in many refinements and the development of various types of gyroscopes suited to specific applications. In recent years, fiber optical gyroscopes have emerged as a significant improvement over the typical spinning mass gyroscopes.

A fiber optic gyroscope is typically constructed using a loop of fiber optic material that guides counter-propagating light waves that are traveling within the fiber optic loop. After traversing the loop, the counter-propagating waves are combined so that they constructively or destructively interfere to form an optical output signal. The intensity of the optical output signal varies as a function of the interference, which is dependent upon the relative phase of the counter-propagating waves. From this information, determinations regarding the orientation and/or rate-of-turn with respect to an inertial frame of reference can be derived.

A closed loop rotation sensor feeds a signal indicative of the Sagnac phase shift to an apparatus for adjusting the phase of the counter-propagating waves to nullify the rotation-induced phase difference between them. The amount that the waves must be adjusted in either phase to nullify the Sagnac phase shift indicates the rotation rate of the sensing loop.

In order to be suitable for inertial navigation applications, a rotation sensor must have a relatively wide dynamic range. The typical rotation sensor is capable of detecting rotation rates as low as 0.001 degrees per hour and as high as 1,000 degrees per second. The dynamic range, ratio of the upper and the finest resolution, measured by a typical rotation sensor, is approximately nine orders of magnitude or $10^9$.

Closed loop fiber optic rotation sensors are attractive due to the increase in the scale factor stability and linearity. Additionally, closed loop operation is feasible due to the availability of high-speed components such as integrated optics phase modulators. Such phase modulators are effective for providing the desired amount of phase modulation for measuring rotation rates in the required dynamic range. However, certain voltage-dependent errors in the feedback signal, phase servo, or electrical cross-coupling, can all cause the servo loop to become less stable at certain rotation rates.

In particular, the system becomes less stable at or near a zero input rate, where the fiber optic rotation sensor output is non-linear with the input rate. Typically, the loop closure electronics feedback circuit will settle at a point where the feedback-dependent voltage error cancels the rate induced Sagnac phase shift and the sensor output signal will be zero for a finite input rate. This range of rates where the fiber optic gyroscope output rate is zero for finite rate range is known as the "dead band," "dead zone," and "region of instability." Other rates at where possible output errors may occur depend upon the modulation/demodulation techniques used in processing the output of the fiber optic rotation sensor.

In addition to the "dead band" performance issue, the present inventors have discovered that the feedback signal sent to the phase modulator to null the rate-induced Sagnac phase shift has a repeated pattern corresponding to a fixed input rate. This repeated pattern is synchronous to the reset frequency of the feedback signal to maintain itself within the maximum range of the driving circuit. Due to the nonlinearity of the driving circuit and the imperfection of IOC nonlinear and time-dependent capacitive and resistive characteristics, the feedback signal renders a rate output with the frequency content directly related to the reset frequency. This rate dependent sinusoids (RDS, but also referred to herein as "color noise" or "fly-back noise") becomes a performance limiting factor if its amplitude is larger than the angle random noise or the bias instability.

In view of the foregoing, it should be appreciated that it would desirable to provide a fiber optic gyroscope that is less susceptible to performance limitations associated with the color noise phenomenon. It should also be appreciated that it would be desirable to provide a method and apparatus for improving the performance stability of inertial guidance systems that incorporate fiber optic gyroscopes.

BRIEF SUMMARY OF THE INVENTION

According to the preferred exemplary embodiments of the present invention, there is provided a phase jump amplitude and timing controller for suppressing color noise due to the repeated drive signal to phase modulator. The phase jump amplitude and timing controller inserts a phase/voltage jump into the feedback signal of the loop closure electronics of the fiber optic gyroscope. This phase/voltage jump breaks the repeated pattern of the drive signal. The IOC time-dependent characteristics are totally eliminated by the randomized feedback signal because no repeated signal is applied to the IOC. The randomized amplitude is preferred to be within the full $\pm\pi$ phase such that the optical errors average to zero. A fixed frequency higher than the interested spectral region can shift the color noise to higher frequency. A randomized frequency can spread the color noise over full spectrum, and totally eliminate the RDS. In other words, the color noise caused by nonlinearity of the driving circuit and IOC spreads out over a wide range of spectrum such that no distinct frequency peaks are apparent in the spectral domain.

BRIEF DESCRIPTION OF THE DRAWINGS

The present invention will hereinafter be described in conjunction with the appended drawing figures, wherein like numerals denote like elements, and:

FIG. 5 is a rate amplitude spectrum plot from the prior art modulation scheme of FIG. 3; and FIG. 6 is a rate amplitude plot obtained with a modulation scheme in accordance with FIG. 4 with randomized amplitude between ±π and a fixed frequency of 1.5 Hz.

DETAILED DESCRIPTION OF THE INVENTION

The following detailed description of a preferred embodiment is merely exemplary in nature and is not intended to limit the invention or the application and uses of the invention.

Figure 1:
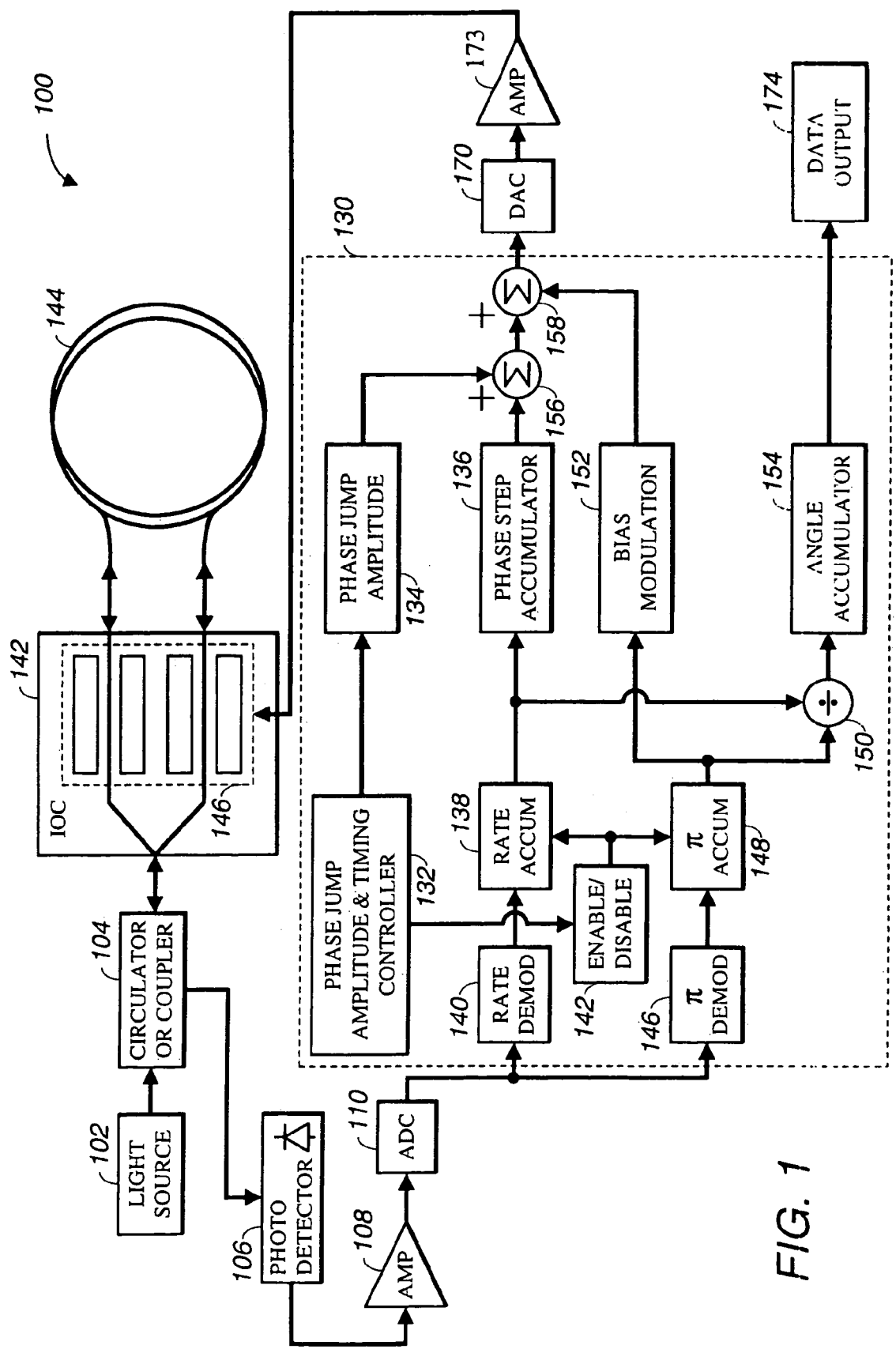
FIG. 1 is a block diagram of a fiber optic gyroscope incorporating a color noise reduction modulation circuit according to a preferred exemplary embodiment of the present invention.

Referring now to FIG. 1, a fiber optic gyroscope 100 with a preferred exemplary embodiment of color noise suppression loop closure electronics comprises: a light source 102; a circulator/coupler 104; an Integrated Optics Chip (IOC) 142; a fiber coil 144; a photo detector 106; an amplifier 108; an analog-to-digital converter 110; a color noise suppression module 130; a DAC 170; an amplifier 173; and a data output point 174.

Light source 102 is any typical fiber light source used by those skilled in the art to manufacture fiber optic gyroscopes. The most preferred embodiment of light source 102 is a 980 nm semiconductor pump laser containing an erbium fiber and fiber bragg gratings capable of shaping the output wavelength to approximately 1,532 nm with an approximate bandwidth of 8 nm. The selection of the exact wavelength and bandwidth for the output of light source 102 will depend on the specific application and any required limitations on optical loss and noise level. In addition, light source 102 typically contains an isolator to reduce the amount of light reintroduced back into light source 102.

Circulator 104 transmits the light emitted by light source 102 and sends it to IOC 142 and also transmits the light returned from IOC 142 to photo detector 106. Instead of using circulator 104, an alternative preferred embodiment of the present invention might use a standard coupler with two inputs and two outputs (2×2) and a 50/50 splitting ratio. While a coupler is typically more physically compact than a circulator, a coupler also increases the amount of optical loss in the system. Accordingly, the selection of the coupler/circulator device to be used in the color noise suppression modulation circuit will depend on the desired operational characteristics and design limitations.

IOC 142 is an electro-optic crystal phase modulator used to modulate the light waves traveling in fiber coil 144. IOC 142 contains a series of electrodes 146 that are used to modulate the light signal received from circulator/coupler 104. While the present invention may be practiced with various types of phase modulators, in the most preferred embodiments of the present invention, IOC 142 uses "square wave" modulation and is fabricated using generic substance LiNbO3. Further, in the most preferred exemplary embodiments, IOC 142 includes a "Y" splitter that splits the light wave traveling from circulator/coupler 104 towards fiber coil 144 and a re-combiner to rejoin the light waves after the waves travel through fiber coil. 144 and return back towards photo detector 106. It is desirable to have IOC 142 provide a relatively fast response time.

IOC 142 is a solid-state device and the components of IOC 142 are housed inside the substrate, protecting them from undesirable environmental changes. Inside IOC 142, the light wave from circulator/coupler 104 is split into two separate signals. One signal will travel a clockwise path through fiber coil 144 and the other signal will travel a counter-clockwise path through fiber coil 144. After traveling through fiber coil 144, the signals are recombined and the difference in the phases of the signals will provide the necessary information to ascertain the rotation rate for fiber optic gyroscope 100.

In addition to the modulation, a phase step signal may also be applied to cancel out the phase difference caused by the rotation. This is called closed-loop operation, because the AC component of the photo diode output will typically be null at or near zero. Alternatively, if IOC 142 provides modulation without the phase step, it is called open loop operation, and the AC signal will be detected at the photo diode of photo detector 106. Closed loop operation is generally considered a better operational mode than open loop operation because the rotation rate output is not as dependent on the power of light source 102.

Fiber coil 144 is the sensing coil that is used to detect the rotation of fiber optic gyroscope 100. Fiber coil 144 typically has a length in the range of 1 Km to 6 Km, depending on the specific application. Longer coils require a longer amount of time for the light waves to travel through fiber coil 144 and generally results in a larger and more easily detected phase shift, which means better accuracy. But a longer coil length may also be susceptible to additional light degradation and larger temperature variation in the fiber coil. Specifically, temperature variations can generate birefringence variation along fiber coil 144, thereby introducing optical error. Accordingly, it is desirable to select a length for fiber coil 144 that is long enough to produce the required accuracy within the limitations of the operational environment for the proposed application, but no longer than necessary so as to avoid introducing optical error.

The amount of time required for the light wave to traverse fiber coil 144 is called "loop transit time" and is represented by "τ." For the most preferred exemplary embodiments of the present invention, fiber coil 144 has a length of approximately 4 Km and will provide a loop transit time of approximately 20 μs.

Photo-detector 106 is used to detect the modulated light signal. Additionally, photo detector 106 transmits the modulated light signal to amplifier 108.

Amplifier 108 acts a signal buffer and is used to increase or decrease the overall gain of the output signal received from photo detector 106. Additionally, amplifier 108 transmits the signal to analog-to-digital converter (ADC) 110.

ADC 110 acts as an interface between the analog and digital signal portions on the input side of color noise suppression module 130 and transforms the analog signal output from amplifier 108 to a digital signal for processing in color noise suppression module 130. It is desirable that ADC 110 provides a good signal to noise ratio and enough data bits to maintain the level of precision and accuracy dictated by the specific application environment.

Color noise suppression module 130 includes a phase jump amplitude and timing controller 132; a phase jump amplitude output signal 134; a rate demodulator 140; a rate accumulator 138; an enable/disable control 142; a π demodulator 146; a π accumulator 148; a phase step accumulator 136; a bias modulation module 152; an angle accumulator 154; a divider 150; an accumulation point 156; and an accumulation point 158.

Color noise suppression module 130 typically incorporates two separate loops. The first loop is the "rate loop" and incorporates rate demodulator 140 and rate accumulator 138. The rate loop is used to sense the rate of change in the rotation of fiber optic gyroscope 100. The output from rate accumulator is known as the "raw rate."

The second loop is the "π loop" and includes π demodulator 146 and π accumulator 148. The π loop provides the bias modulation information and is used to maintain the absolute amplitude of the modulation corresponding to the interference pattern of the re-combined light waves. In some applications, the modulation depth will be π/2, but other modulation depths such as 3π/4 may also be employed, depending on the specific requirements of the intended application and the deployment environment for fiber optic gyroscope 100.

Bias modulation 152 provides the modulation for the output from phase step accumulator 136 and the phase jump amplitude from phase jump amplitude signal 134. Additionally, the most preferred embodiments of the present invention use a "dual-ramp" modulation technique although those skilled in the art will appreciate that other modulation techniques may be employed including, for example, "square-wave" modulation or "serrodyne" modulation.

The output from rate accumulator 138 is divided by the output from π accumulator 148 at point 150 to give the normalized rate of rotation for fiber optic gyroscope 100. To increase the accuracy of the calculation, the normalized rate is typically integrated at angle accumulator 154 before being sent to data output point 174.

Digital-to-analog converter (DAC) 170 transforms the digital signal output from color noise suppression module 130 to an analog signal for use in the feedback loop supplied to IOC 142. Amplifier 172 acts a signal buffer and is used to increase or decrease the overall gain of the output signal from DAC 170.

Data output point 174 is provided as an interface point for connecting fiber optic gyroscope 100 to a computer or other device thereby interfacing fiber optic gyroscope 100 to a larger inertial measurement system.

Phase step accumulator 136 accumulates the rate and creates the phase step. It should be noted that the phase step will be linear if the rotation rate is steady. The rate is actually modulated by the output of bias modulation module 152 at accumulation point 158 and sent to DAC 170 for driving the feedback loop for IOC 142.

Phase jump amplitude and timing controller 132 introduces an additional phase jump amplitude signal 134 at a prescribed frequency. Phase jump amplitude signal 134 is an output signal from phase jump amplitude and timing controller 132 and is applied at accumulation point 156. The magnitude of the phase jump amplitude and the frequency of the phase jump can be selected within broad parameters. The magnitude of phase jump amplitude signal 134 is preferred to be within ±π such that the optical errors in the fiber optic gyroscope 100 average to zero. The frequency of phase jump amplitude signal 134 generation need only be higher than the interested spectral region in the fiber optic gyroscope 100. The exact frequency will depend on the specific design and operational parameters of a given fiber optic gyroscope 100 and will vary from application to application. Additionally, the amplitude and frequency of phase jump amplitude signal 134 may be fixed at a predetermined level or may be random within a group of parameters to ensure appropriate operation.

After phase jump amplitude signal 134 has been applied, it is desirable to wait for τ before sampling the signal again in order to allow the signal associated with phase jump amplitude signal 134 to pass through IOC 142 and fiber coil 144, thereby allowing the output signal associated with phase jump amplitude signal 134 to be intentionally skipped. This is accomplished by selectively using enable/disable module 142 to disable the accumulation of rate accumulator 138 and π accumulator 148. However, the sample can be used in the demodulation process if the phase jump amplitude is selected such that the corresponding sample carries rate or $V_\pi$ information.

Enable/disable module 142 is controlled by phase jump amplitude and timing controller 132. In turn, enable/disable module 142 controls the accumulation of rate accumulator 138 and π accumulator 148. This allows enable/disable module 142 to prevent phase jump amplitude signal 134, as generated by phase jump amplitude and timing controller 132, from artificially skewing the results by including phase jump amplitude signal 134 in the feedback loop to IOC 142.

In sum, phase jump amplitude and timing controller 132 inserts a phase/voltage jump, represented by phase jump amplitude signal 134, into the feedback signal of the loop closure electronics of fiber optic gyroscope 100. By generating a sufficient numbers of phase-voltage jumps within a given time period, as determined by the interested frequency range, the loop closure electronics will average the optical errors over the full feedback voltage range. This error averaging process effectively eliminates the optical errors and allows the loop closure electronics to sense the actual rate of rotation for the fiber optic gyroscope.

Figure 3:
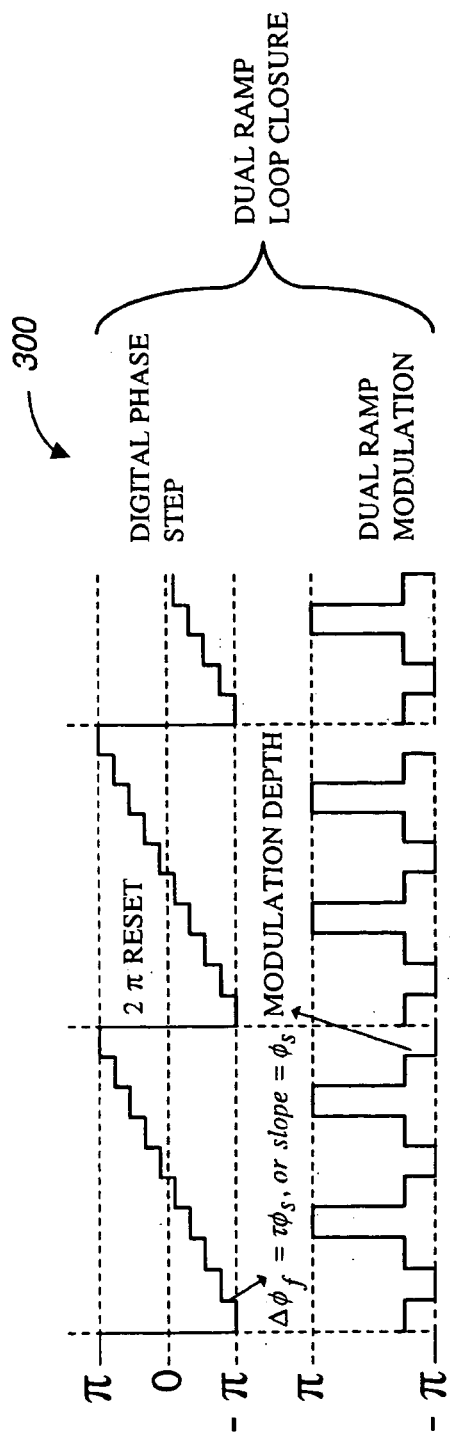
FIG. 3 is a modulation timing diagram for loop closure electronics depicting a typical modulation scheme without incorporating the present invention.

Referring now to FIG. 3, a wave diagram 300 illustrating a typical dual ramp loop closure operation is depicted. As previously mentioned, the present invention may be practiced using a dual ramp modulation scheme or any other type of modulation technique presently known or later developed by those skilled in the art. The modulation process is used to bias the light wave interference pattern to a position where optical sensitivity is greatest, thereby allowing the interference pattern to be accurately detected. In addition, the modulation process also cancels out some undesirable electronic noise.

A square wave modulation signal provides a fairly simple and symmetrical output signal. However, dual ramp modulation, such as that shown in FIG. 3, provides not only the rate information, but also the absolute π value of the interference pattern. The purpose of introducing the digital phase step is to null the phase difference induced by the rotation rate. In an analog presentation, the digital phase step output will be displayed as a saw-tooth waveform. If the rotation rate remains unchanged, the phase step in every τ remains constant.

Due to the physical limitations of the output device used to drive IOC 142, the amplitude range of the digital phase step must also be confined. In one preferred embodiment of the present invention, a driving range based on multiple integers of 2π is selected because most optical errors cancel out in the average of the 2π range. Additionally, selecting the 2π range requires minimal driving voltage. Whenever the digital phase step hits the upper or lower boundary in this range, it is reset 2π downward or upward and cycles continually through this range.

Figure 4:
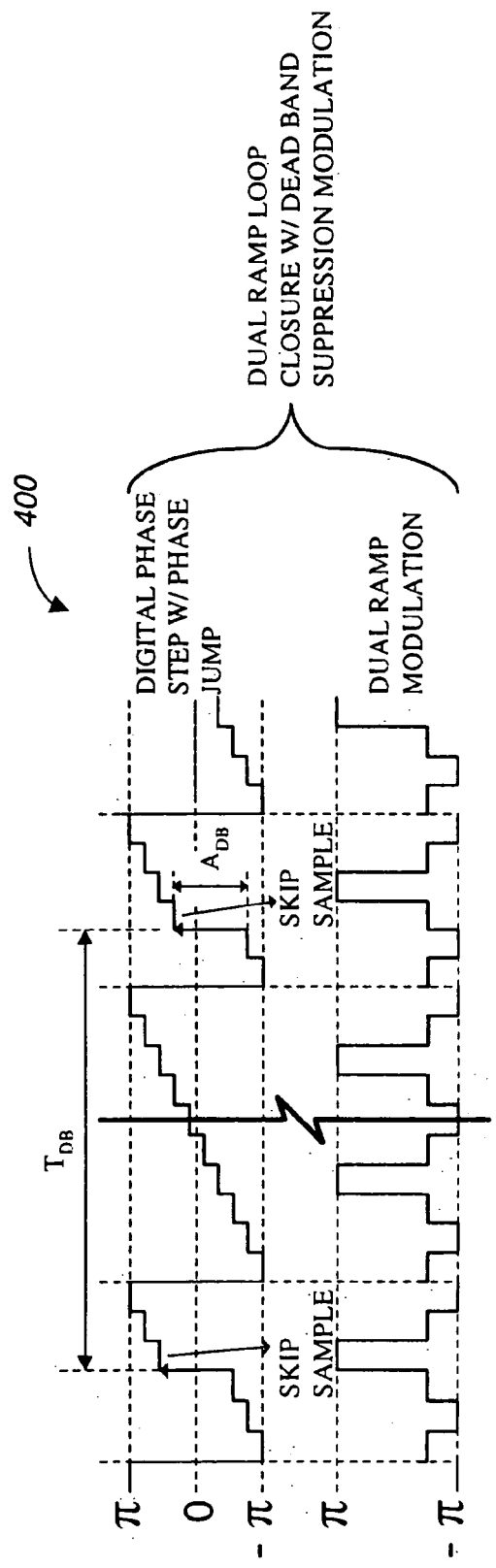
FIG. 4 is a modulation timing diagram for loop closure electronics using a preferred exemplary embodiment of the color noise suppression modulation of the present invention.

Referring now to FIG. 4, a wave diagram 400 illustrating the use of the color noise suppression modulation for a dual ramp loop closure operation is depicted. In this diagram, the same dual ramp modulation scheme is employed but a color noise suppression modulation phase jump with amplitude $A_{DB}$ is shown. The period of the frequency for the application of the color suppression modulation phase jump is illustrated by $T_{DB}$. As previously mentioned, the amplitude and frequency of the color noise suppression modulation phase jump can be a pre-determined height and rate or, in an alternative preferred embodiment, a randomized color noise suppression modulation phase jump that changes over time may also be employed.

More specifically, the slope of the modulation signal determines the rate. From FIGS. 3 and 4, one can imagine that, at a fixed rate, the modulation signal will ramp up and reset 2pi phase down to be within the output drive range (obviously, there is no such device that can be used to continuously ramp up without limitation). A by product of the reset signal is a distinct peak at the rate spectrum (Fourier transform). This phenomenon is what is referred to as "color noise" or "fly-back noise" because a distinct frequency corresponds to a distinct color (as opposed to the color white, which corresponds to a flat spectrum). This phenomenon is also referred to as Rate Dependent Sinusoids (RDS) because the reset rate of the ramp depends on the rate sensed; the higher rate, the higher the sinusoid frequency. The present inventors have discovered that the method described to address dead band suppression is also applicable to eliminate color noise (or RDS) because the randomized amplitude jumps at modulation signal break the frequency pattern of a fixed rate produced.

Although a specific loop closure electronics circuit configuration has been shown in FIG. 1, it should be noted that other types of circuit implementations could be readily adopted by those skilled in the art. For example, the digital signal processing of the present invention could be implemented using a microprocessor configuration, a Field Programmable Gate Array (FPGA), or a Digital Signal Processing (DSP) chip. Additionally, an analog circuit design could also accomplish the necessary processing steps in order to practice the teachings of the present invention.

Figure 2:
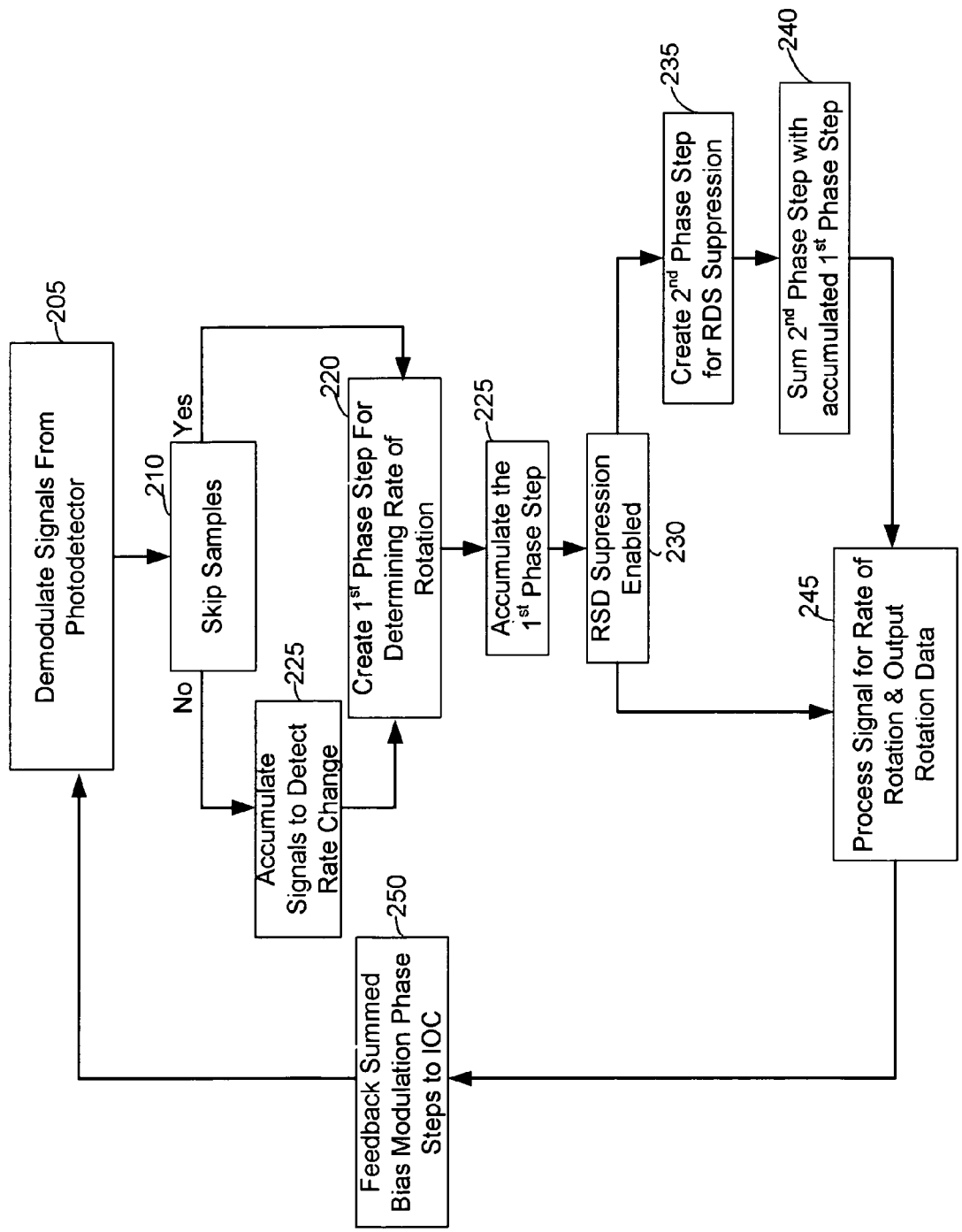
FIG. 2 is a flow chart depicting a method for implementing color noise suppression according to a preferred exemplary embodiment of the present invention.

Referring now to FIGS. 1 and 2, a method 200 for implementing a preferred exemplary embodiment of the color noise suppression modulation technique of the present invention is shown. As shown in FIG. 2, the output signal from photo detector 106 is continually demodulated (step 205). It is then determined whether samples should be skipped or kept (step 210). If samples are not to be skipped, then the signal from photo detector 106 is accumulated in rate accumulator 138 and π accumulator 148 to detect any rate change (step 215). Then, the appropriate phase step is created to cancel out the rotation-induced phase shift (step 220), if any. If samples are to be skipped (step 210), then the procedure proceeds immediately to step 220. Thereafter, any phase step output is accumulated in phase step accumulator 136 (step 225). Then, assuming that RDS (color noise) suppression is not enabled (step 230), the signal from rate accumulator 138 is divided by the signal from π accumulator 148 and is then accumulated by angle accumulator 154 and finally output at data output signal 174 (step 245). The accumulated phase step from phase step accumulator is then modulated and returned to IOC 142 in a feedback loop (step 250).

If RDS (color noise) suppression is enabled (step 230="yes"), a signal is sent to determine if the samples received from photo detector 106 should be skipped or kept. Accordingly, it will also determine if the demodulated signal should be accumulated to detect rate change (step 215). A 2nd phase step is created for color noise suppression modulation (step 235). This 2nd phase step is then summed with the accumulated 1st phase (step 240). The combined phase step is then summed with the output signal from bias modulation module 152 (step 245) before being sent to drive IOC as part of the overall feedback loop (step 250).

FIG. 5 is the rate data taken from an IFOG with the modulation described in FIG. 3. It shows the RDS, or color noise, at 3.8 Hz and its harmonics. These RDS disappear as shown in FIG. 6, in which the new modulation scheme described in FIG. 4 is implemented. The randomized amplitude applied is between ±π, and the frequency applied is about 1.5 Hz.

From the foregoing detailed description of the preferred exemplary embodiments, it should be appreciated that apparatus and methods are provided for suppressing color noise in fiber optic gyroscopes (FOGs).

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A fiber optic gyroscope comprising:
   a loop closure electronic circuit, said loop closure electronic circuit generating a first phase step signal for determining a rate of rotation;
   a color noise suppression module coupled to said loop closure electronic circuit, said color noise suppression module generating a randomized phase jump amplitude signal; and
   an accumulation point, said accumulation point summing said phase jump amplitude signal and said first phase step signal, thereby creating a feedback signal for said fiber optic gyroscope.

2. The fiber optic gyroscope of claim 1, wherein said phase jump amplitude signal comprises a second phase step.

3. The fiber optic gyroscope of claim 1, further comprising a data output point for outputting a rate of rotation signal from said fiber optic gyroscope.

4. The fiber optic gyroscope of claim 3, wherein said data output point is coupled to an inertial navigation system.

5. The fiber optic gyroscope of claim 1, wherein said the color noise suppression module further comprises a bias modulation module, said bias modulation module modulating said feedback signal.

6. The fiber optic gyroscope of claim 1, further comprising:
   an analog-to-digital converter, said analog-to-digital converter converting said phase step signal from an analog signal to a digital signal; and a digital-to-analog converter, said digital-to-analog converter converting said feedback signal from a digital signal to an analog signal.

7. The fiber optic gyroscope of claim 1, further comprising at least one amplifier for amplifying at least one of said first phase step signal or said feedback signal.

8. A fiber optic gyroscope with color noise suppression, said fiber optic gyroscope comprising:
   an electro-optic crystal phase modulator, said electro-optic crystal modulator generating a modulated signal;
   a first phase jump signal added to said modulated signal;
   a photo detector coupled to said electro-optic crystal phase modulator, said photo detector detecting said modulated signal;
   an amplifier coupled to said photo detector, said amplifier amplifying said modulated signal;
   an analog-to-digital converter, said analog-to-digital converter converting said modulated signal to a digital modulated signal;
   a phase jump amplitude and timing controller, said phase jump amplitude and timing controller generating a randomized phase jump amplitude signal, said phase jump amplitude signal being combined with said modulated signal to create a feedback signal; and
   wherein said feedback signal is coupled to an input of said electro-optic crystal phase modulator.

9. The fiber optic gyroscope of claim 8, wherein said phase jump amplitude signal comprises a second phase step.

10. The fiber optic gyroscope of claim 8, further comprising a data output point for outputting a rate of rotation signal from said fiber optic gyroscope.

11. The fiber optic gyroscope of claim 10, wherein said data output point is coupled to an inertial navigation system.

12. The fiber optic gyroscope of claim 10, wherein a feedback signal amplifier is coupled between an output point for said feedback signal and said input of said electro-optic crystal phase modulator, said feedback signal amplifier amplifying said feedback signal.

13. A method comprising the steps of:
   creating a plurality of phase steps for determining a rate of rotation signal in a fiber optic gyroscope;
   accumulating said plurality of phase steps to create an accumulated phase step signal;
   creating a randomized phase jump amplitude signal for enabling color noise suppression; and
   summing said phase jump amplitude signal with said accumulated phase step signal to create a feedback signal for said fiber optic gyroscope.

14. The method of claim 13, further comprising the step of supplying said feedback signal to a feedback loop, said feedback loop being connected to said fiber optic gyroscope.

15. The method of claim 13, further comprising the step of selectively enabling or disabling color noise suppression.

16. The method of claim 15, further comprising the step of skipping at least one signal sample if said color noise suppression is enabled.

17. The method of claim 15, further comprising the step of outputting said rate of rotation signal if said color noise suppression is disabled.

* * * * *